United States Patent
Hillion et al.

(10) Patent No.: US 7,920,956 B2
(45) Date of Patent: Apr. 5, 2011

(54) METHOD OF CONTROLLING THE COMBUSTION OF A COMPRESSION IGNITION ENGINE USING COMBUSTION TIMING CONTROL

(75) Inventors: Mathieu Hillion, Paris (FR); Jonathan Chauvin, Neuilly-sur-Seine (FR)

(73) Assignee: IFP, Cedex (FR)

( * ) Notice: Subject to any disclaimer, the term of this patent is extended or adjusted under 35 U.S.C. 154(b) by 0 days.

(21) Appl. No.: 12/542,827

(22) Filed: Aug. 18, 2009

(65) Prior Publication Data
US 2010/0049423 A1  Feb. 25, 2010

(30) Foreign Application Priority Data
Aug. 19, 2008 (FR) .................... 08 04641

(51) Int. Cl.
  *F02D 41/30* (2006.01)
(52) U.S. Cl. ........... 701/103; 123/435
(58) Field of Classification Search ......... 701/103–105; 123/435, 436, 472, 480
See application file for complete search history.

(56) References Cited

U.S. PATENT DOCUMENTS

| | | | |
|---|---|---|---|
| 6,234,145 B1 | 5/2001 | Shomura | |
| 2010/0185378 A1* | 7/2010 | Hillion et al. | 701/103 |

FOREIGN PATENT DOCUMENTS
EP  0 810 362 A2  12/1997

OTHER PUBLICATIONS

Bengtsson, Johan, et al: "Model Predictive Control of Homogeneous Charge Compression Ignition (HCCI) Engine Dynamics", Control Applications, 2006 IEEE International Conference on, IEEE, PI, Oct. 1, 2006, pp. 1675-1680, XP031011488, ISBN: 978-0-7803-9795-8.

* cited by examiner

*Primary Examiner* — Hai H Huynh
(74) *Attorney, Agent, or Firm* — Antonelli, Terry, Stout & Kraus, LLP.

(57) ABSTRACT

A method of controlling the combustion of a compression ignition engine is disclosed having applications for diesel engine combustion control for CAI.

The method comprises determining setpoint values for physical parameters linked with the intake of gaseous oxidizer in the combustion chamber, and a setpoint value $(\theta_{inj})_{ref}$ for the crank angle at which a fuel has to be injected into the combustion chamber. While the engine control system controls actuators so that the values of the physical parameters are equal to the setpoint values, setpoint value $(\theta_{inj})_{ref}$ is corrected before the physical parameters reach their setpoint values. Angle CAy is controlled to be equal to a reference value for an optimized combustion while accounting for differences between the real values of the physical parameters and the setpoint values of these parameters and keeps the optimum combustion by fuel injection with the corrected setpoint value.

6 Claims, 2 Drawing Sheets

METHOD OF CONTROLLING THE COMBUSTION OF A COMPRESSION IGNITION ENGINE USING COMBUSTION TIMING CONTROL

BACKGROUND OF THE INVENTION

1. Field of the Invention

The present invention relates to engine control and more particularly to the combustion control of compression ignition engines, such as diesel engines or CAI (Controlled Auto-Ignition) engines.

2. Description of the Prior Art

Figure 1:
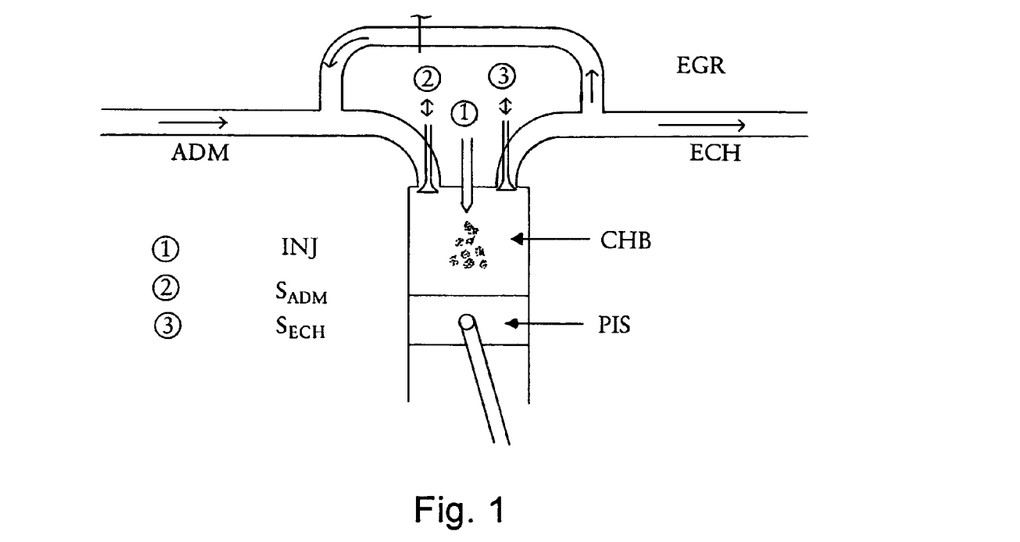
FIG. 1 shows the various phases of a combustion cycle of a compression ignition engine.

Operation of a diesel engine is based on auto-ignition of a mixture of air, burnt gas and fuel. The engine cycle can be broken down into several phases (FIG. 1):

- upon intake (ADM), intake valve ($S_{ADM}$) allows the mixture of air and of burnt gas into chamber (CHB). The air is taken from the outside environment of the engine. The burnt gas is taken from exhaust manifold (ECH) and sent back to the intake manifold (exhaust gas recirculation EGR). This gas mixture fills combustion chamber (CHB) and mixes with the burnt gas remaining in the chamber since the previous combustion (internal EGR); the intake valve closes (IVC: Intake Valve Closing). Piston (PIS) compresses the gas;
- fuel injector (INJ) injects a precise mass of fuel. After a short auto-ignition delay period, the mixture of air, burnt gas and fuel ignites, thus creating an overpressure that drives the piston downwards;
- once the piston has been driven down again, exhaust valve ($S_{ECH}$) opens and the gas mixture is thus discharged through the exhaust manifold. After closing of the exhaust valve, part of the gases remains in the cylinder (internal EGR). The gases discharged through the exhaust manifold are divided in two. A part is recirculated towards the intake (EGR) whereas the rest is discharged out of the engine (via the exhaust).

The goal of such engine control is to supply the driver with the torque required while minimizing the noise and pollutant emissions. Control of the proportions of different gases and of fuel therefore has to be adjusted as finely as possible.

To carry out combustion control of a compression ignition engine, there are known methods allowing determination of the combustion medium by detectors mounted in the engine. The most precise means uses a pressure detector in the combustion chamber. Such a method is described for example in the following document:

J. Bengtsson, P. Strandh, R. Johansson, P. Tunestal and B. Johansson, "*Control of Homogeneous Charge Compression Ignition (HCCI) Engine Dynamics*", Proceeding of the 2004 American Control Conference, Boston, Jun. 30-Jul. 2, 2004.

However, using such detectors in standard vehicles cannot be considered due to the considerable cost of such detectors. Furthermore, these detectors are generally subject to relatively fastdrifting.

There are also methods wherein the proportions and timing are optimized on each static working point (speed and torque) so as to bring out an ideal strategy at each point. A test bench calibration is therefore performed in order to obtain the optimum values for the main two data sets:

- the mass of air $M_{air}$ and of burnt gas $M_{gb}$ required in the combustion chamber, denoted by $X_{air} = (M_{air}, M_{gb})$;
- the mass of fuel $M_f$ and the crank angle $\theta_f$ at which the fuel is injected, denoted by $X_{fuel} = (M_f, \theta_f)$.

However, these strategies are insufficient in transient phases. In fact, during transition phases from one working point to another (change in the vehicle speed or in the road profile), the engine control supervises the various actuators present in the engine to guarantee the desired torque while minimizing the noise, the pollutant emissions and the consumption. This is thus translated into the change from the values of the parameters of the initial point to the values of the parameters of the final point:

$$\begin{cases} X_{air}^{initial} \rightarrow X_{air}^{final} & (a) \\ X_{fuel}^{initial} \rightarrow X_{fuel}^{final} & (b) \end{cases}$$

Now, there are two time scales in the engine. The faster one (50 Hz) corresponds to the entire combustion phenomenon (1 engine cycle). On this scale, the injection strategy ($X_{fuel}$) can be changed to control the combustion. It is the fuel loop (see (b)). The slower one (1 Hz) corresponds to the gas dynamics in the engine manifolds (intake, exhaust, burnt gas recirculation). The strategy of this air loop ($X_{air}$) cannot be changed faster (see (a)).

With the current methods, the controlled variables ($X_{air}$, $X_{fuel}$) do therefore not reach at the same time their setpoint values because of this difference in dynamics. The objectives regarding torque production, consumption, pollutants, noise are thus met in the static phases (the two dynamic loops are stabilized at their reference values); on the other hand, if precautions are not taken in the transient phases, part of the parameters nearly instantaneously reach their final setpoint value whereas the other part is still at the initial setpoint values, which causes the engine to produce more pollutant emissions or noise, and it can even stop in some cases.

Figure 2:
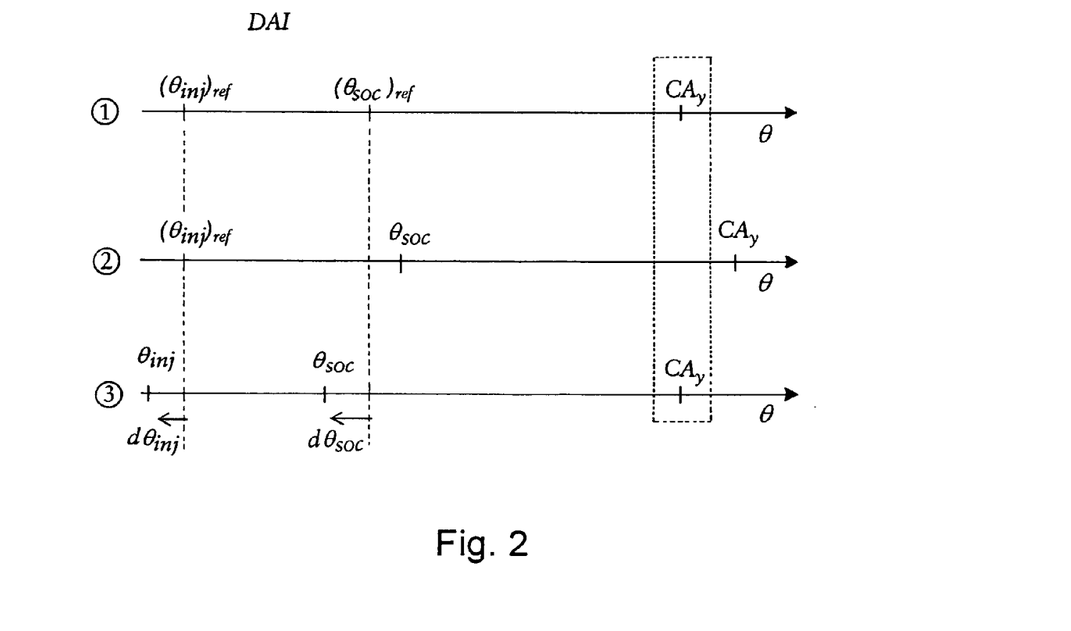
FIG. 2 illustrates a combustion chronology as a function of the crank angle according to three combustion control situations: optimum control (performed in stabilized phase), current control in transient phase without $CA_y$ control and desired control in transient phase with $CA_y$ control.
Figure 3:
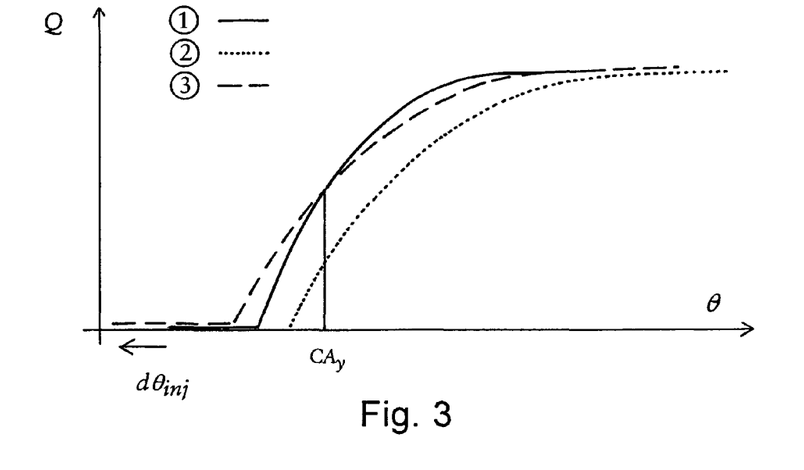
FIG. 3 illustrates the three energy release curves Q as a function of crank angle $\theta$ the three situations described in FIG. 2.

Furthermore, without cylinder pressure detectors, the known methods do not allow control of combustion timing during the transient phases. Now, as illustrated by FIGS. 2 and 3, this is not sufficient to ensure proper operation of the engine under transient conditions.

SUMMARY OF THE INVENTION

The invention relates to a method providing control of the combustion of a compression ignition engine, notably under transient conditions, while overcoming prior art problems. The method achieves this, on the one hand, by controlling the two dynamic loops separately and, on the other hand, by correcting the reference value of the injection angle via control of angle $CA_y$.

The invention thus relates to a method of controlling the combustion of a compression ignition engine, comprising: determining setpoint values for physical parameters linked with the intake of a gaseous oxidizer in a combustion chamber, and a setpoint value $(\theta_{inj})_{ref}$ for a crank angle at which a fuel has to be injected into the combustion chamber, the setpoint values being determined so as to optimize combustion, and an engine control system controls actuators in such a way that the values of the physical parameters are equal to the setpoint values. The method comprises the following stages:

correcting the setpoint value $(\theta_{inj})_{ref}$ before the physical parameters reach their setpoint values, by calculating a correction $d\theta_{inj}$ to be applied to setpoint value $(\theta_{inj})_{ref}$ so that a crank angle $CA_y$ at which y percent of the fuel is consumed during combustion is equal to a reference value of this angle for an optimized combustion; and controlling with the engine control system a fuel injection into the combustion chamber when the crank angle is equal to the corrected setpoint value $(\theta_{inj})_{ref}$ in order to keep an optimum combustion.

According to an embodiment, correction $d\theta_{inj}$ is determined by accounting for the differences between real values of the physical parameters and the setpoint values of the physical parameters, and by controlling crank angle $CA_y$ by combustion modelling comprising a first model intended to model an auto-ignition phenomenon and a second model intended to model an energy release as a function of crank angle $CA_y$. Correction $d\theta_{inj}$ can then be determined by applying the following stages:

determining the real values of the physical parameters;

calculating the differences between the real values and the setpoint values;

calculating first linearization coefficients by linearizing the first model to the first order;

calculating second linearization coefficients by linearizing the second model to the first order and by considering that crank angle $CA_y$ is equal to its reference value; and calculating correction $d\theta_{inj}$ by a linear combination of differences, the coefficients of the linear combination being defined from the first and second linearization coefficients.

According to the invention, the physical parameters can be selected from among at least the following parameters upon valve closing: pressure in the combustion chamber ($P_{IVC}$), temperature in the combustion chamber ($T_{IVC}$), ratio ($X_{IVC}$) between a burnt gas mass and a total gas mass in the combustion chamber, and total mass ($M_{IVC}$) of gas in the cylinder.

BRIEF DESCRIPTION OF THE FIGURES

Other features and advantages of the method according to the invention will be clear from reading the description hereafter of embodiments given by way of non limitative example, with reference to the accompanying figures wherein.

DETAILED DESCRIPTION

The method according to the invention allows controlling of the combustion progress of a compression ignition engine, in static phase as well as in transient phase. It comprises separate and independent control of the air loop (slow loop) and of the fuel loop (fast loop), then adaptation of the fuel loop dynamics so as to be coherent with the air loop. The method thus allows adaptation of $X_{fuel}$ to keep the characteristics of the combustion required (through the driver's torque request). The impact on emissions and noise is thus limited while ensuring the required torque to the driver.

According to this method, control of the combustion of a compression ignition engine is carried out in four stages:

1—Determining Setpoint Values for Various Physical Parameters

During transition phases from one working point to another (change in the vehicle speed or in the road profile), the engine control supervises the various actuators present in the engine to guarantee the desired torque while minimizing the noise, the pollutant emissions and the consumption. This is thus translated into the change from the values of parameters $X_{air}$ and $X_{fuel}$ of an initial point to the values of the parameters of a final point:

$$\begin{cases} X_{air}^{initial} \to X_{air}^{final} & (a) \\ X_{fuel}^{initial} \to X_{fuel}^{final} & (b) \end{cases}$$

The final values are defined so as to optimize combustion, that is to burn a maximum amount of fuel in order to minimize emissions and consumption while minimizing the noise. These final values optimizing the combustion are referred to as setpoint values. The engine control is intended to enforce these setpoint values.

The important physical parameters regulated by the air loop and that need to be known are the pressure, the temperature and the chemical composition of the gases in the combustion chamber. Ideally, these parameters reach their setpoint value instantaneously. In reality, the slowness of the air loop results in an error on these parameters $X_{air}$ between their setpoint value and their real value throughout the transition phase. Consequently, the thermodynamic parameters (mass, pressure, temperature and burnt gas rate) of the gas feed sucked in the cylinder are different from their setpoint value. The fuel loop control is adapted to the errors on the following parameters:

P: the pressure in the combustion chamber. It depends on crank angle $\theta$,

T: the temperature in the combustion chamber. It depends on crank angle $\theta$, X: the ratio between the burnt gas mass and the total gas mass in the combustion chamber (parameter between 0 and 1). This rate does not evolve throughout the cycle and it is therefore equal to the burnt gas rate upon intake valve closing, M: the total mass of gas (air+burnt gas) trapped in the cylinder. The mass being conserved, this parameter is constant.

We distinguish in our analysis the value of these parameters upon valve closing (IVC):

$P_{IVC}$: the pressure in the combustion chamber upon valve closure, $T_{IVC}$: the temperature in the combustion chamber upon valve closure, $X_{IVC}$: the ratio between the burnt gas mass and the total gas mass in the combustion chamber upon valve closure, $M_{IVC}$: the total mass of gas (air+burnt gas) in the cylinder.

The values of these four parameters are continuously determined. We therefore assume that composition ($X_{IVC}$) and pressure ($P_{IVC}$) in the cylinder at ivc are the same as those in the intake manifold where measurements are available (through detectors or estimators). We estimate $T_{IVC}$ by means of the ideal gas law $$T_{IVC} = \frac{P_{IVC} V_{IVC}}{R M_{IVC}}$$

where R is the ideal gas constant (R=287) and $M_{IVC}$ is the mass sucked by the cylinder that is measured by a flowmeter.

For these four physical parameters linked with the intake of gaseous oxidizer in the combustion chamber of the engine, the setpoint values are respectively denoted by: $P_{ref}$, $T_{ref}$, $X_{ref}$ and $M_{ref}$.

These setpoint values are obtained from a setpoint map established on an engine test bench: the setpoint values of these parameters are given by the optimum point mapped on the test bench (values that these parameters must reach). These setpoint values are determined so as to optimize the combustion.

The reference value of these parameters is given by the optimum point mapped on the test bench (value that these parameters must reach):

$P_{ref}$: the reference pressure in the combustion chamber upon valve closing (obtained for the reference optimum point), $T_{ref}$: the reference temperature in the combustion chamber upon valve closing (obtained for the reference optimum point), $X_{ref}$: the reference value of the ratio between the burnt gas mass and the total gas mass in the combustion chamber upon valve closing (obtained for the reference optimum point), $M_{ref}$: the reference value of the gas mass trapped in the cylinder (obtained for the reference optimum point).

These parameters are connected by the ideal gas relation (PV=MRT) but, for simplicity reasons, this relation is not directly explained, which does not affect the method provided in any way.

According to the invention, the important fuel strategy parameter for adapting the fuel loop is the crank angle denoted by $\theta_{inj}$, for which fuel is injected. Its setpoint value is denoted by $\theta_{inj}^{ref}$. This value is also given by the optimum point mapped on the engine test bench. It corresponds to setpoint values $P_{ref}$, $T_{ref}$, $X_{ref}$ and $M_{ref}$.

2—Air Loop Control (Slow Loop)

Once setpoint values $P_{ref}$, $T_{ref}$, $X_{ref}$ and $M_{ref}$ determined, an engine control system controls actuators in such a way that the values of the physical parameters $P_{IVC}$, $T_{IVC}$, $X_{IVC}$ and $M_{IVC}$ are equal to these setpoint values ($P_{ref}$, $T_{ref}$, $X_{ref}$ and $M_{ref}$).

Ideally, the four parameters $P_{IVC}$, $T_{IVC}$, $X_{IVC}$ and $M_{IVC}$ instantaneously reach their setpoint values $P_{ref}$, $T_{ref}$, $X_{ref}$ and $M_{ref}$. In reality, the slowness of the air loop results in an error on these parameters between the setpoint value and their real value throughout the transition phase. Setpoint value $(\theta_{inj})_{ref}$ of the injection angle is therefore adapted.

3—Correcting the Setpoint Value of the Injection Angle $(\theta_{inj})_{ref}$

If the air loop control was perfect, the four parameters $P_{IVC}$, $T_{IVC}$, $X_{IVC}$ and $M_{IVC}$ would reach their reference values $P_{ref}$, $T_{ref}$, $X_{ref}$ and $M_{ref}$ instantaneously. In reality, the air loop cannot be made as fast as desired. In the transient phase, parameters $P_{IVC}$, $T_{IVC}$, $X_{IVC}$ and $M_{IVC}$ are therefore different from their reference value. The content of the cylinder upon valve closing is therefore different from the reference content for which the injection strategy was mapped.

The errors on these parameters upon valve closing ($dP=P_{IVC}-P_{ref}$), ($dT=T_{IVC}-T_{ref}$), ($dM=M_{IVC}-M_{ref}$) and ($dX=X_{IVC}-X_{ref}$) therefore have to be taken into account to modify the fuel injection angle so as to keep a combustion that is as close as possible to the reference combustion.

According to the invention, combustion timing is controlled by controlling the angle $CA_y$, which corresponds to the crank angle at which y % of the fuel has been consumed by the combustion. In the description hereafter, y thus is any real number between 0 and 100 (y=0 corresponds to a combustion start control).

A new corrected injection angle $(\theta_{inj})_{ref}+d\theta_{inj}$ is therefore sought so that angle $CA_y$ has its reference value ($d_{CA_y}=CA_y-(CA_y)_{ref}=0$). We therefore seek $d\theta_{inj}$ such that (see FIGS. 2 and 3 for the situations):

If there is no error, that is, if all the parameters have reached their reference value ((dP, dT, dM, dX)=(0, 0, 0, 0)), we are exactly in the situation of the reference working point, we thus have $d\theta_{inj}=0$ (situation ①), If the parameters have not reached their reference value ((dP, dT, dM, dX)≠(0, 0, 0, 0)), the duration of the auto-ignition delay period and the combustion velocity are not identical to those of the reference combustion. We thus have a phase shift of the entire combustion process and angle $CA_y$ has not reached its reference value (situation ②), In order to counterbalance the errors (dP, dT, dM, dX)≠(0, 0, 0, 0), we thus introduce an angular correction $d\theta_{inj}\neq0$ on the injection angle to have the same phasing $CA_y$. Correction $CA_y$ also leads to an offset of the combustion start angle. The combustion start angle then becomes $(\theta_{soc})_{ref}+d\theta_{soc}$ (situation ③).

FIG. 2 illustrates a combustion chronology according to three situations. For each situation, the horizontal axis represents crank angle θ. These axes comprise: the setpoint value $(\theta_{inj})_{ref}$ of the injection angle, the setpoint value $(\theta_{soc})_{ref}$ of the combustion angle, angle $CA_y$, the effective value $(\theta_{soc})$ of the combustion angle and the effective value $(\theta_{inj})$ of the injection angle. It can also be noted that the auto-ignition delay (DAI) ranges between $(\theta_{inj})_{ref}$ and $(\theta_{soc})_{ref}$ and that combustion occurs from $(\theta_{soc})_{ref}$.

FIG. 3 illustrates the three energy release curves Q as a function of crank angle θ for the three situations described above (FIG. 2).

Modelling of the combustion system is then performed. According to the invention, this modelling comprises two models: one allowing modelling of the auto-ignition phenomenon and the second allowing the energy release.

According to a particular embodiment example, the models described below can be used.

Auto-Ignition Model

Therefore, the "Knock integral" model is first used. This model is described in the following document:

K. Swan, M. Shahbakhti and C. R. Koch, "*Predicting Start of Combustion Using a Modified Knock Integral Method for an HCCI Engine*", in Proc. Of SAE Conference, 2006.

It is important to note that the injection angle controller synthesis method provided is applicable to any auto-ignition delay model having the same integral form as that of Swan et al.

According to this model, combustion start does not occur immediately after fuel injection. There is an auto-ignition delay period that is modelled in the form of the Knock integral. The latter allows determination of the combustion start angle $\theta_{soc}$ from the values of parameters P, T, X and $\theta_{inj}$:

$$\int_{\theta_{inj}}^{\theta_{soc}} g(P(\theta), T(\theta), X, N_e)\, d\theta = 1$$

with:

$$g(P, T, X, N_e) = \frac{1}{6N_e} \frac{A}{C_1 + C_2 X} \cdot P^n \cdot \exp\left(\frac{T_A}{T}\right)$$

A, $C_1$, $C_2$, n and $T_A$ are fixed physical parameters to be calibrated, $N_e$ is the engine speed. Conventionally, it is considered to be constant (this hypothesis being justified by the fact that the speed variations are much slower than the variations of the other parameters considered), θ is the crank angle.

We then consider that, before the combustion start, the gas mixture is under adiabatic compression. Knowledge of P(θ), T(θ) can thus be readily reduced to that of $P_{IVC}$, $T_{IVC}$ and of the volume of the chamber V(θ), the latter being perfectly known. Furthermore, the burnt gas ratio does not evolve throughout the compression phase without combustion $X(\theta)=X_{IVC}$. The Knock integral can thus be reduced to the following integral:

$$\int_{\theta_{inj}}^{\theta_{soc}} f(P_{IVC}, T_{IVC}, X_{IVC}, N_e, \theta) d\theta = 1$$

with f being an entirely known function defined in Appendix 3.

Energy Release Model

In order to control the entire combustion progress, via angle $CA_y$, and not only the combustion start, it is necessary to consider an energy release model.

It is possible to use Chmela's diesel energy release model (F. G. Chmela and G. C. Orthaber, "Rate of Heat Release Prediction for Direct Injection Diesel Engines Based on Purely Mixing Controlled Combustion", in *Proc. Of SAE Conference*, 1999). This model gives the energy release linked with the diesel combustion in form of a differential equation:

$$\frac{dQ}{d\theta} = C_{mode}\left(M_f - \frac{Q}{Q_{LHV}}\right)\exp\left(C_{rate}\frac{\sqrt{k(\theta)}}{\sqrt[3]{V_{cyl}(\theta)}}\right)$$

with:

$M_f$: the total mass of fuel injected,
$Q_{LHV}$: the mass energy available in the fuel,
Q: the energy released by the combustion,
$V_{cyl}(\theta)$: the volume of the cylinder,
k(θ): the turbulent kinetic energy density present in the cylinder. It meets a certain differential equation presented in Appendix 4,
$C_{mode}$ and $C_{rate}$: two constants,
$N_e$: the engine speed.

A modification is made to this model in order to account for the presence of recirculated burnt gas in the combustion chamber. Therefore, a term is added as a function of the burnt gas ratio $X_{IVC}$ present before combustion in the following form:

$$\frac{dQ}{d\theta} = C_{mode}\left(M_f - \frac{Q}{Q_{LHV}}\right)\exp\left(C_{rate}\frac{\sqrt{k(\theta)}}{\sqrt[3]{V_{cyl}(\theta)}}\right)h(X_{IVC}) \quad (1)$$

with:

h being a known derivable function.

It is important to note that the synthesis method provided is independent of the form of function h, the most commonly used function being $h(X_{IVC})=(1-X_{IVC})^\beta$ where β is a constant.

Parameter set example

| Parameter | β |
|---|---|
| Unit | [1] |
| Value | 0.5 |

It is considered:

that the entire fuel mass has been injected before the combustion start. Parameter $M_f$ of differential equation (1) is thus constant and equal to the total mass of fuel injected.

An expression is obtained for the turbulent kinetic energy density as a function of crank angle θ, masses $M_{IVC}$, $M_f$ and fuel injection angle $\theta_{inj}$ is in the form as follows (see Appendix 4):

$$k(\theta, \theta_{inj}, M_f, M_{IVC}, N_e) = C_{turb}\frac{k_0(M_f, N_e)}{M_{IVC} + M_f}e^{-\frac{C_{diss}}{6N_e}(\theta - \theta_{inj})}$$

with: $C_{diss}$ a constant and $k_0(M_f,N_e)$ a known function that is set by the shape of the fuel flow rate profile (given by the technical characteristics of the injection system).

Equation (1) can be converted so that it involves the fuel mass fraction consumed by the reaction (x ∈[0,1]) and angle $CA_y$ (see Appendix 5):

$$\int_{\theta_{soc}}^{CA_y} \frac{C_{mode}}{Q_{LHV}}\exp\left(C_{rate}\frac{\sqrt{k(\theta, \theta_{inj}, M_f, M_{IVC}, N_e)}}{\sqrt[3]{V_{cyl}(\theta)}}\right)h(X_{IVC})d\theta = \quad (2)$$

$$\int_0^{\frac{y}{100}} \frac{dx}{(1-x)} = -\ln\left(1 - \frac{y}{100}\right)$$

Estimating the Correction of the Injection Angle Setpoint Value $(\theta_{inj})_{ref}$ Correction calculation is carried out in two identical stages applied to the two models (auto-ignition and energy release). The models are linearized at $P_{IVC}$, $T_{IVC}$, $M_{IVC}$, $X_{IVC}$, $\theta_{inj}$ and $\theta_{soc}$ around their reference values by introducing differences dP, dT, dM, dX, $d\theta_{inj}$ and $d\theta_{soc}$. Two equations are obtained allowing obtaining $d\theta_{inj}$ according to the air loop errors dP, dT, dM, dX.

First Stage:

By linearizing the Knock integral to the first order, it is possible to simply connect correction $d\theta_{inj}$ to the combustion start angle variation $d\theta_{soc}$ (Thus assume the following small perturbations: $d\theta_{inj} \prec\prec \theta_{inj}$, $dP \prec\prec P_{ref}$, $dT \prec\prec T_{ref}$ and $dX \prec\prec X_{ref}$). Therefore, the auto-ignition delay equation $$\int_{\theta_{inj}}^{\theta_{soc}} f(P_{IVC}, T_{IVC}, X_{IVC}, N_e, \theta) d\theta = 1$$

is considered as an implicit equation at ($P_{IVC}$, $X_{IVC}$, $X_{IVC}$, $\theta_{inj}$ and $\theta_{soc}$) that is linearized around values ($P_{ref}$, $T_{ref}$, $X_{ref}$, $(\theta_{inj})_{ref}$, $(\theta_{soc})_{ref}$), which allows introduction of differences (dP, dT, dX, $d\theta_{inj}$ and $d\theta_{soc}$). An equation of the form as follows is obtained:

$$d\theta_{soc} = \alpha_{inj}d\theta_{inj} + \alpha_p dP + \alpha_T dT + \alpha_X dX \quad (3)$$

Linearization coefficients $\alpha_{inj}$, $\alpha_p$, $\alpha_T$ and $\alpha_X$ thus represent the respective influences of errors dP, dT, dX and of $d\theta_{inj}$ on the combustion start offset $d\theta_{soc}$. Their expressions are given in Appendix 1.

Second Stage:

Similarly, equation (2) is considered as an implicit equation at ($M_{IVC}$, $X_{IVC}$, $\theta_{inj}$ and $\theta_{soc}$). It is linearized around ($P_{ref}$, $T_{ref}$, $M_{ref}$, $X_{ref}$, $(\theta_{inj})_{ref}$ and $(\theta_{soc})_{ref}$), which allows introduction of the differences (dM, dX, $d\theta_{inj}$ and $d\theta_{soc}$) (thus assuming the following small perturbations: $d\theta_{inj} \ll \theta_{inj}$, $dM \ll M_{ref}$, $dX \ll X_{ref}$ and $d\theta_{soc} \ll \theta_{soc}$), and the following relation is obtained:

$$\beta_{CA_y} d\theta_{CA_y} + \beta_{inj} d\theta_{inj} + \beta_M dM + \beta_X dX + \beta_{soc} d\theta_{soc} = 0$$

According to the invention, the injection angle is corrected via control of $CA_y$. This is translated into the condition: $d_{CA_y} = CA_y - (CA_y)_{ref} = 0$ (angle $CA_y$ has its reference value).

Thus the following relation (4) is used:

$$\beta_{inj} d\theta_{inj} + \beta_M dM + \beta_X dX + \beta_{soc} d\theta_{soc} = 0 \quad (4)$$

Linearization coefficients $\beta_{inj}$, $\beta_M$, $\beta_X$, $\beta_{soc}$ represent the respective influences of errors dM, dX and of offsets $d\theta_{soc}$ and $d\theta_{inj}$ for keeping the same angle $CA_y$ during combustion. Their expressions are given in Appendix 2. These expressions involve the reference value of $CA_y$: $(CA_y)_{ref}$. To obtain this value, it is possible either to use mapping, or to use the auto-ignition and energy release models wherein reference values $P_{ref}$, $T_{ref}$, $M_{ref}$, $X_{ref}$ and $(\theta_{inj})_{ref}$ are used. The auto-ignition model then allows obtaining $(\theta_{soc})_{ref}$ and the auto-ignition model allows determination of $(CA_y)_{ref}$.

With equations (3) and (4), the following correction to be applied is obtained:

$$d\theta_{inj} = \kappa_P dP + \kappa_X dX + \kappa_M dM + \kappa_T dT$$

with
$$\begin{cases} \kappa_P = -\dfrac{\beta_{soc} \alpha_P}{\beta_{inj} + \beta_{soc} \alpha_{inj}} \\ \kappa_X = -\dfrac{\beta_{soc} \alpha_X + \beta_X}{\beta_{inj} + \beta_{soc} \alpha_{inj}} \\ \kappa_M = -\dfrac{\beta_M}{\beta_{inj} + \beta_{soc} \alpha_{inj}} \\ \kappa_T = -\dfrac{\beta_{soc} \alpha_T}{\beta_{inj} + \beta_{soc} \alpha_{inj}} \end{cases}$$

4—Fuel Loop Adaptation (Fast Loop)

The engine control system drives the fuel injection system in the combustion chamber when the crank angle is equal to the corrected setpoint value $(\theta_{inj})_{ref} + d\theta_{inj}$ in order to keep an optimum combustion.

One interest of the method is to directly relate the air loop errors to the correction to be applied to the fuel command via parameters ($\kappa_P$, $\kappa_T$, $\kappa_X$, $\kappa_M$) that are entirely calculable since everything is perfectly known (they only depend on functions f, k, reference values $P_{ref}$, $T_{ref}$, $X_{ref}$ and $M_{ref}$ and on a certain number of known constants).

By applying the previous correction to the injection angle, it is ensured (first order) that angle $CA_y$ is at its reference value (selection of the linearization coefficients $\beta_{inj}$, $\beta_M$, $\beta_X$, $\beta_{soc}$).

Figure 4:
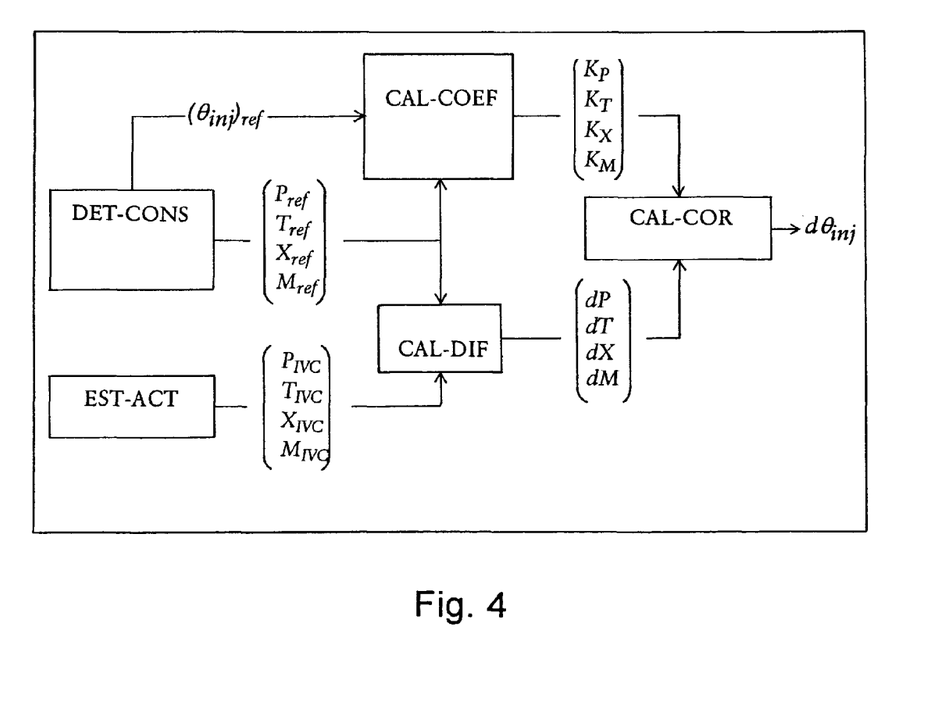
FIG. 4 illustrates a calculation scheme for correction $d\theta_{inj}$ of the fuel injection angle.

Little by little, the air loop have lead errors dP, dT, dM and dX tending towards zero, and the correction disappears in the stabilized static phases. The control strategy is diagrammatically shown in FIG. 4. FIG. 4 illustrates a calculation scheme for correction $d\theta_{inj}$ of the fuel injection angle. After estimating (EST-ACT) the real values of $P_{IVC}$, $T_{IVC}$, $M_{IVC}$ and $X_{IVC}$, determining (DET-CONS) setpoint values $P_{ref}$, $T_{ref}$, $X_{ref}$, $M_{ref}$ and $(\theta_{inj})_{ref}$ the (CAL-DIF) differences dP, dT, dM and dX are calculated. Then (CAL-COEF) the linearization coefficients $\kappa_P$, $\kappa_T$, $\kappa_X$, $\kappa_M$ are calculated in accordance with the two combustion models selected. Finally, the (CAL-COR) correction $d\theta_{inj}$ is calculated:

$$d\theta_{inj} = \kappa_P dP + \kappa_X dX + \kappa_M dM + \kappa_T dT$$

APPENDIX 1

Expression of the Linearization Coefficients $$\alpha_{inj}, \alpha_P, \alpha_T, \alpha_X$$

Therefore, the following relationships exist:

$$d\theta_{soc} = \alpha_{inj} d\theta_{inj} + \alpha_P dP + \alpha_T dT + \alpha_X dX \quad (3)$$

with:

$$\begin{cases} \alpha_P = -\dfrac{\left(\int_{(\theta_{inj})_{ref}}^{(\theta_{soc})_{ref}} \dfrac{\partial f}{\partial P}(P_{ref}, T_{ref}, X_{ref}, N_e, \theta) d\theta\right)}{f(P_{ref}, T_{ref}, X_{ref}, N_e, (\theta_{soc})_{ref})} \\ \qquad = -\dfrac{n}{P_{ref}} \cdot \dfrac{1}{f(P_{ref}, T_{ref}, X_{ref}, N_e, (\theta_{soc})_{ref})} \\ \alpha_T = -\dfrac{\left(\int_{(\theta_{inj})_{ref}}^{(\theta_{soc})_{ref}} \dfrac{\partial f}{\partial T}(P_{ref}, T_{ref}, X_{ref}, N_e, \theta) d\theta\right)}{f(P_{ref}, T_{ref}, X_{ref}, N_e, (\theta_{soc})_{ref})} \\ \qquad = -\dfrac{\dfrac{T_A}{T_{IVC}^2} \cdot \left(\int_{(\theta_{inj})_{ref}}^{(\theta_{soc})_{ref}} f\left(\begin{array}{c} P_{ref}, T_{ref}, \\ X_{ref}, N_e, \theta \end{array}\right) \cdot v^{1-\gamma}(\theta) d\theta\right)}{f(P_{ref}, T_{ref}, X_{ref}, N_e, (\theta_{soc})_{ref})} \\ \alpha_X = -\dfrac{\left(\int_{(\theta_{inj})_{ref}}^{(\theta_{soc})_{ref}} \dfrac{\partial f}{\partial X}(P_{ref}, T_{ref}, X_{ref}, N_e, \theta) d\theta\right)}{f(P_{ref}, T_{ref}, X_{ref}, N_e, (\theta_{soc})_{ref})} \\ \qquad = \dfrac{\left(\begin{array}{c} \dfrac{C_2}{C_1 + C_2 X_{ref}} \cdot \\ \int_{(\theta_{inj})_{ref}}^{(\theta_{soc})_{ref}} f\left(\begin{array}{c} P_{ref}, T_{ref}, \\ X_{ref}, N_e, \theta \end{array}\right) \cdot \\ \ln(v(\theta))\left[n + \dfrac{T_A}{T_{IVC}} v^{1-\gamma}(\theta)\right] d\theta \\ \dfrac{d\gamma}{dX}(T_{ref}, X_{ref}) \end{array}\right)}{f(P_{ref}, T_{ref}, X_{ref}, N_e, (\theta_{soc})_{ref})} \end{cases}$$

$$\alpha_{inj} = \dfrac{f(P_{ref}, T_{ref}, X_{ref}, N_e, (\theta_{inj})_{ref})}{f(P_{ref}, T_{ref}, X_{ref}, N_e, (\theta_{soc})_{ref})}$$

$$et \begin{cases} f\left(\begin{array}{c} P_{ref}, T_{ref}, \\ X_{ref}, N_e, \\ \theta \end{array}\right) = \dfrac{1}{6N_e} \dfrac{A}{C_1 + C_2 X_{ref}} \cdot P_{ref}^n \cdot v^{\gamma \cdot n}(\theta) \exp\left(\dfrac{\dfrac{T_A}{T_{ref}}}{v^{1-\gamma}(\theta)}\right) \\ v(\theta) = \dfrac{V_{IVC}}{V(\theta)} \end{cases}$$

APPENDIX 2

Expression of the Linearization Coefficients $\beta_{inj}, \beta_M, \beta_X, \beta_{soc}$ Therefore, the following relationships exist:

$$\beta_{inj} d\theta_{inj} + \beta_M dM + \beta_X dX + \beta_{soc} d\theta_{soc} = 0 \quad (4)$$

with:

$$\begin{cases}
\beta_{inj} = \dfrac{C_{mode}}{Q_{LHV}} h(X_{IVC}) \int_{(\theta_{soc})_{ref}}^{(CA_y)_{ref}} \dfrac{\partial \exp\left(C_{rate} \dfrac{\sqrt{k\left(\theta,(\theta_{inj})_{ref}, M_f,(M_{IVC})_{ref}\right)}}{\sqrt[3]{V_{cyl}(\theta)}}\right)}{\partial \theta_{inj}} d\theta \\[2em]
= \dfrac{C_{diss}}{2} \dfrac{C_{mode}}{6N_e Q_{LHV}} h(X_{IVC}) C_{rate} \int_{(\theta_{soc})_{ref}}^{(CA_y)_{ref}} \dfrac{\sqrt{k\left(\theta,(\theta_{inj})_{ref}, M_f,(M_{IVC})_{ref}\right)}}{\sqrt[3]{V_{cyl}(\theta)}} \\[1em]
\quad \exp\left(C_{rate} \dfrac{\sqrt{k\left(\theta,(\theta_{inj})_{ref}, M_f,(M_{IVC})_{ref}\right)}}{\sqrt[3]{V_{cyl}(\theta)}}\right) d\theta \\[2em]
\beta_M = \dfrac{C_{mode}}{Q_{LHV}} h(X_{IVC}) \int_{(\theta_{soc})_{ref}}^{(CA_y)_{ref}} \dfrac{\partial \exp\left(C_{rate} \dfrac{\sqrt{k\left(\theta,(\theta_{inj})_{ref}, M_f,(M_{IVC})_{ref}\right)}}{\sqrt[3]{V_{cyl}(\theta)}}\right)}{\partial M_{IVC}} d\theta \\[2em]
= -\dfrac{C_{mode}}{Q_{LHV}} \dfrac{h(X_{IVC})}{2(M_{IVC} + M_f)} C_{rate} \int_{(\theta_{soc})_{ref}}^{(CA_y)_{ref}} \dfrac{\sqrt{k\left(\theta,(\theta_{inj})_{ref}, M_f,(M_{IVC})_{ref}\right)}}{\sqrt[3]{V_{cyl}(\theta)}} \\[1em]
\quad \exp\left(C_{rate} \dfrac{\sqrt{k\left(\theta,(\theta_{inj})_{ref}, M_f,(M_{IVC})_{ref}\right)}}{\sqrt[3]{V_{cyl}(\theta)}}\right) d\theta \\[2em]
\beta_X = \dfrac{C_{mode}}{Q_{LHV}} \int_{(\theta_{soc})_{ref}}^{(CA_y)_{ref}} \dfrac{\partial h(X_{IVC})}{\partial C_{IVC}} \exp\left(C_{rate} \dfrac{\sqrt{k\left(\theta,(\theta_{inj})_{ref}, M_f,(M_{IVC})_{ref}\right)}}{\sqrt[3]{V_{cyl}(\theta)}}\right) d\theta \\[1em]
= \dfrac{h'(X_{IVC})}{h(X_{IVC})} \ln\left(1 - \dfrac{y}{100}\right) \\[1em]
\beta_{soc} = -\exp\left(C_{rate} \dfrac{\sqrt{k\left((\theta_{soc})_{ref},(\theta_{inj})_{ref}, M_f(M_{IVC})_{ref}\right)}}{\sqrt[3]{V_{cyl}((\theta_{soc})_{ref})}}\right) \\[1em]
etk(\theta, \theta_{inj}, M_f, M_{IVC}) = C_{turb} \dfrac{k_0(M_f, N_e)}{M_{IVC} + M_f} e^{\frac{C_{diss}}{6N_e}(\theta - \theta_{inj})}
\end{cases}$$

APPENDIX 3

Knock Integral

Combustion start does not occur immediately after fuel injection. There is an auto-ignition delay period that is modelled in form of the Knock integral. The latter implicitly relates the injection angle to the combustion start angle:

$$\int_{\theta_{inj}}^{\theta_{soc}} g(P(\theta), T(\theta), X, N_e) d\theta = 1$$

with $$g(P, T, X, N_e) = \dfrac{1}{N_e} \dfrac{A}{C_1 + C_2 X} \cdot P^n \cdot \exp\left(-\dfrac{T_A}{T}\right)$$

$\theta$ is the crank angle,
A, $C_1$, $C_2$, n and $T_A$ are fixed and known parameters of the model,
$N_e$ is the engine speed.
Parameter set example:

| | Parameter | | | | |
|---|---|---|---|---|---|
| | A | $C_1$ | $C_2$ | n | $T_A$ |
| Unit | (hPa)$^{-n}$ s$^{-1}$ | 1 | 1 | 1 | ° K |
| Value | 0.22 | 1 | 10.5 | 1.13 | 1732 |

Considering that the gas mixture is perfect and that it is subjected to an adiabatic compression, the following exists before combustion start:

$$P(\theta) \cdot V(\theta)^\gamma = cste \Rightarrow P(\theta) = P_{IVC} \cdot v^\gamma(\theta)$$

$$T(\theta) \cdot V(\theta)^{\gamma-1} = cste \Rightarrow T(\theta) = T_{IVC} \cdot v^{\gamma-1}(\theta)$$

with:

$$-v(\theta) = \dfrac{V_{IVC}}{V(\theta)}$$

: entirely known volume function,
$V_{IVC}$: chamber volume upon valve closing,
$V(\theta)$: chamber volume as a function of the crank angle,
$\gamma(X)$: adiabatic compression parameter. It notably depends on the chemical composition X,
X: the composition does not evolve in the cylinder. It is therefore equal to the composition upon intake valve closing: $X = X_{IVC}$.

Therefore, the following general equation is finally obtained:

$$\int_{\theta_{inj}}^{\theta_{soc}} f(P_{IVC}, T_{IVC}, X_{IVC}, N_e, \theta) d\theta = 1$$

with $$f(P_{IVC}, T_{IVC}, X_{IVC}, N_e, \theta) = \\ \dfrac{1}{6N_e} \dfrac{A}{C_1 + C_2 X_{IVC}} \cdot P_{IVC}^n \cdot v^{\gamma(X_{IVC}) \cdot n}(\theta) \exp\left(-\dfrac{T_A}{T_{IVC}} \cdot v^{1-\gamma(X_{IVC})}(\theta)\right)$$

APPENDIX 4

Obtaining the Turbulent Kinetic Energy Density

In direct-injection diesel combustion, it is common to consider that the turbulent kinetic energy is mainly due to fuel injection (of the order of 95%). The evolution of the turbulent kinetic energy density k is thus governed by the differential equation as follows:

$$\begin{cases} \dfrac{dk}{d\theta} = -\dfrac{C_{diss}}{6N_e}k + \dfrac{C_{turb}}{M_f + M_{ivc}}\dfrac{dE_{cin}}{d\theta} \\ \dfrac{dE_{cin}}{d\theta} = C_D(N_e) \cdot D_{carb}^3 \end{cases}$$

with:

$C_D(N_e)$: a function that depends on the engine speed (therefore considered to be constant), $C_{turb}$: a constant, $D_{carb}$: the instantaneous fuel flow rate. It depends on the mass injected (which determines the duration and the profile of the fuel flow rate). Furthermore, if injection is offset in time, this profile is also offset. The fuel flow rate therefore depends only on $M_f$ and on the time interval between the present time (crank angle $\theta$) and injection (crank angle $\theta_{inj}$), which gives:

$$D_{carb} = D_{carb}\left(M_f, \dfrac{\theta - \theta_{inj}}{N_e}\right).$$

Parameter set example:

| Parameter | $C_{turb}$ | $C_{diss}$ | $C_D(Ne)$ |
|---|---|---|---|
| Unit | [—] | s$^{-1}$ | m$^2$kg$^{-2}$ |
| Value | 1 | 200 | 9e$^{-6}$/Ne (rpm) |

The first-order differential equation can be integrated with the constant variation method:

$$k(\theta) = \dfrac{k_0(M_f, \theta, \theta_{inj}, N_e)}{M_f + M_{IVC}} e^{-\frac{C_{diss}}{N_e}(\theta - \theta_{inj})}$$

with:

$$k_0(M_f, \theta, \theta_{inj}, N_e) = C_{turb}\int_{\theta_{inj}}^{\theta} C_D(N_e) D_{carb}\left(M_f, \dfrac{z - \theta_{inj}}{N_e}\right)^3 e^{\frac{C_{diss}}{N_e}(z-\theta_{inj})} dz$$

The above integral has a non-zero integrand only during injection (outside, the fuel flow rate is zero). If the injection time is denoted by $\Delta\theta_{inj}$, therefore, the following must exist:

$$\forall \theta > \theta_{inj} + \Delta\theta_{inj}, k_0(M_f, \theta, \theta_{inj}, N_e) =$$

$$C_{turb}C_D(N_e) \cdot \int_{\theta_{inj}}^{\theta_{inj}+\Delta\theta_{inj}} D_{carb}\left(M_f, \dfrac{z-\theta_{inj}}{N_e}\right)^3 e^{\frac{C_{diss}}{N_e}(z-\theta_{inj})} dz$$

The expression of k during combustion (k appearing only in the expression of the energy release) is considered. Now, it is assumed that injection is complete when combustion starts. Therefore:

$$\forall \theta > \theta_{soc} > \theta_{inj} + \Delta\theta_{inj}, k_0(M_f, \theta, \theta_{inj}, N_e) =$$

$$C_{turb}C_D(N_e) \cdot \int_{\theta_{inj}}^{\theta_{inj}+\Delta\theta_{inj}} D_{carb}\left(M_f, \dfrac{z-\theta_{inj}}{N_e}\right)^3 e^{\frac{C_{diss}}{N_e}(z-\theta_{inj})} dz =$$

$$C_{turb}C_D(N_e) \cdot \int_{\theta}^{\Delta\theta_{inj}} D_{carb}\left(M_f, \dfrac{z}{N_e}\right)^3 e^{\frac{C_{diss}}{N_e}z} dz = cste$$

Thus, during combustion, $k_0$ depends on the way the fuel is injected (profile of $D_{carb}$) but it does not directly depend on $\theta_{inj}$ or on $\theta$. Thus:

$$k(\theta) = \dfrac{k_0(M_f, N_e)}{M_f + M_{IVC}} e^{-\frac{C_{diss}}{N_e}(\theta - \theta_{inj})}$$

with $$k_0(M_f, N_e) = C_{turb}C_D(N_e) \cdot \int_0^{\Delta\theta_{inj}} D_{carb}\left(M_f, \dfrac{z}{N_e}\right)^3 e^{\frac{C_{diss}}{N_e}z} dz$$

APPENDIX 5

Energy Release

During combustion, the energy release occurs according to the following law:

$$\dfrac{dQ}{d\theta} = C_{mode}\left(M_f - \dfrac{Q}{Q_{LHV}}\right)\exp\left(C_{rate}\dfrac{\sqrt{k(\theta)}}{\sqrt[3]{V_{cyl}(\theta)}}\right)h(X_{IVC})$$

Parameter set example

| Parameter | $C_{mode}$ | $Q_{LHV}$ | $C_{rate}$ |
|---|---|---|---|
| Unit | kJ · kg$^{-1}$deg$^{-1}$ | kJ · kg$^{-1}$ | s |
| Value | 350 | 42789 | 1.5e$^{-3}$ |

If the consumed fuel mass fraction is denoted by x, we have the conventional relation as follows that relates the released energy Q, the total chemical energy contained in the fuel $M_f Q_{LHV}$ and x: $Q = xM_f Q_{LHV}$.

Finally, by transferring the second equation into the first, the following relationship exists:

$$dx = \dfrac{C_{mode}}{Q_{LHV}}(1-x)\exp\left(C_{rate}\dfrac{\sqrt{k(\theta)}}{\sqrt[3]{V_{cyl}(\theta)}}\right)h(X_{IVC})d\theta \Leftrightarrow \dfrac{dx}{(1-x)} =$$

$$\dfrac{C_{mode}}{Q_{LHV}}\exp\left(C_{rate}\dfrac{\sqrt{k(\theta)}}{\sqrt[3]{V_{cyl}(\theta)}}\right)h(X_{IVC})d\theta$$

$CA_y$ is the crank angle at which y % of the fuel has been consumed. It therefore corresponds to $$x = \frac{y}{100}.$$

The two members of the last equation can thus be integrated separately to obtain an implicit relation between $CA_y$ and the combustion start $\theta_{soc}$:

$$\int_0^{\frac{y}{100}} \frac{dx}{(1-x)} = -\ln\left(1 - \frac{y}{100}\right)$$

$$= h(X_{IVC}) \int_{\theta_{soc}}^{CA_y} \frac{C_{mode}}{Q_{LHV}} \exp\left(C_{rate} \frac{\sqrt{k(\theta)}}{\sqrt[3]{V_{cyl}(\theta)}}\right) d\theta$$

The invention claimed is:

1. A method of controlling the combustion of a compression ignition engine, comprising:
    determining setpoint values for physical parameters linked with intake of gaseous oxidizer in a combustion chamber, and a setpoint value for a crank angle at which fuel has to be injected into the combustion chamber, the setpoint values being determined to optimize combustion and controlling actuators of an engine control system so that the values of the physical parameters are equal to the setpoint values including correcting the setpoint values before the physical parameters reach their setpoint values, by calculating a correction to be applied to the setpoint value so that a crank angle at which a percentage of the fuel is consumed during combustion is equal to a reference value of the angle for optimum combustion, and controlling fuel injection into the combustion chamber when the crank angle is equal to the corrected setpoint value to optimize combustion.

2. A method as claimed in claim 1, wherein the correction is determined by accounting for differences between real values of the physical parameters and the setpoint values of the physical parameters, and by controlling the crank angle by combustion modelling comprising a first model for modelling an auto-ignition and a second model for modelling an energy release as a function of crank angle.

3. A method as claimed in claim 2, wherein the correction is determined by determining real values of the physical parameters comprising:
    calculating differences between the real values and the setpoint values;
    calculating first linearization coefficients by linearizing the first model to be first order;
    calculating second linearization coefficients by linearizing the second model to be first order by assuming the crank angle to be equal to the reference value thereof; and
    calculating the correction using a linear combination of the differences, with coefficients of the linear combination being defined from the first and second linearization coefficients.

4. A method as claimed in claim 3, wherein:
    the physical parameters are selected from among at least the following parameters upon valve closing: pressure in the combustion chamber, temperature in the combustion chamber, a ratio between a burnt gas mass and a total gas mass in the combustion chamber, and total mass of gas in the cylinder.

5. A method as claimed in claim 2, wherein:
    the physical parameters are selected from among at least the following parameters upon valve closing: pressure in the combustion chamber, temperature in the combustion chamber, a ratio between a burnt gas mass and a total gas mass in the combustion chamber, and total mass of gas in the cylinder.

6. A method as claimed in claim 1, wherein:
    the physical parameters are selected from among at least the following parameters upon valve closing: pressure in the combustion chamber, temperature in the combustion chamber, a ratio between a burnt gas mass and a total gas mass in the combustion chamber, and total mass of gas in the cylinder.

* * * * *